(12) United States Patent
Sprunk

(10) Patent No.: US 6,424,713 B1
(45) Date of Patent: Jul. 23, 2002

(54) CRYPTOGRAPHIC SYSTEM WITH CONCEALED WORK FACTOR

(75) Inventor: Eric Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 08/972,835

(22) Filed: Nov. 18, 1997

Related U.S. Application Data (63) Continuation of application No. 08/650,579, filed on May 31, 1996.
(60) Provisional application No. 60/001,587, filed on Jul. 27, 1995.

(51) Int. Cl.$^7$ .................................. H04L 9/00
(52) U.S. Cl. .......................................... 380/44
(58) Field of Search ..................... 380/44, 29

(56) References Cited

U.S. PATENT DOCUMENTS

| | | | |
|---|---|---|---|
| 4,908,861 A | * 3/1990 | Brachtl et al. | 380/25 |
| 5,323,464 A | * 6/1994 | Elander et al. | 380/24 |
| 5,416,841 A | * 5/1995 | Merrick | 380/29 |
| 5,483,598 A | * 1/1996 | Kaufman et al. | 380/43 |

FOREIGN PATENT DOCUMENTS

| | | | |
|---|---|---|---|
| EP | 0604008 | * | 6/1994 |
| GB | 2274229 | * | 7/1994 |

OTHER PUBLICATIONS

Bruce Scheneier, "Applied Cryptography," 2nd Ed. Sections 8.1, 8.2, 10.1, and 15.5.*

"Applied Cryptography," by Bruce Schneier, pp129–153, catalogued 1993, 1994.*

Schneier, Bruce, "Applied Cryptography", John Wiley & Sons, Inc., USA, 1996, pp. 357–363.

Quisquater, Jean–Jacques et al. "The Importance of 'Good' Key Scheduling Schemes (How to Make A Secure DES Scheme with $\leq 48$ Bit Keys?)," *Lecture Notes in Computer Science,* Advances in Cryptology—CRYPTO '85 Proceedings, 1986, pp. 537–542.

Bruce Scheiner, "Applied Cryptography," 2nd Edition 1996, pp. 214–215.

* cited by examiner

*Primary Examiner*—Gail Hayes
*Assistant Examiner*—Hrayr A. Sayadian
(74) *Attorney, Agent, or Firm*—Barry R. Lipsitz (57) ABSTRACT

A cryptographic key is provided for cryptographically processing information. A first key is generated according to a key generator scheme. A key space of the first key is reduced in accordance with a key space reduction scheme. The reduced key space is distributed over a larger key space in accordance with a one-way key space distribution function to provide the cryptographic key. The cryptographic key has an associated first work factor for a person without knowledge of the key space distribution function, and an associated second work factor which is less than the first work factor for a person with knowledge of the key space distribution function. Information is cryptographically processed using the cryptographic key, and a new key is generated at a rate of R keys per second to provide a desired protection factor $P=W/RZ$ for a cryptographic system having a lifetime Z.

28 Claims, 4 Drawing Sheets

CRYPTOGRAPHIC SYSTEM WITH CONCEALED WORK FACTOR

This application is a continuation of commonly assigned, copending U.S. patent application Ser. No. 08/650,579 filed May 31, 1996.

This application claims the benefit of U.S. Provisional Application No. 60/001,587, filed Jul. 27, 1995.

FIELD OF THE INVENTION

The present invention relates to cryptographic systems, and, more particularly, to a method and apparatus for generating cryptographic keys with a concealed work factor. The system provides a high apparent work factor to maintain a high level of security against attackers. At the same time, with knowledge of a secret distribution key, a governmental agency is presented with a lower work factor.

BACKGROUND OF THE INVENTION

A cryptographic system uses cryptographic keys to secure data. Clear text is transformed into cipher text by the use of at least one cryptographic key which is known at the transmitter and delivered to the receiver for use in decryption of the cipher text. The size (e.g., length) of the cryptographic key is one measure of the level of security provided by the cryptographic system. For example, for the commonly used Data Encryption Standard (DES), the key length is 56 bits. Thus, since each bit can assume one of two possible values (e.g., 0 or 1), up to $2^{56}$ attempts would be required to discover a given cryptographic key using a trial and error approach.

Discovery of the key generation sequence is another form of attack on the system. Generally, cryptographic keys are typically changed often to thwart trial and error attacks. The rate of key generation is a measure of cryptographic agility. Changing the key often makes it more difficult to discover the key because the key is not used for very long. For example, it may be acceptable to provide only one key for a two hour video program where a security breach is not critical. Alternatively, when a significant level of security is required, several (e.g., ten) new keys may be generated each second. In any case, the attacker could have access to some sequence of the cryptographic keys during the normal operation of a cryptographic system. For example, the attacker may gain access to the sequence of keys by becoming a legitimate subscriber of an information service. Over time, the attacker could observe and collect a large number of valid cryptographic keys. The attacker could then use these keys to extrapolate or guess the method of key generation.

Since the number of possible keys increases with bit length, the longer the bit length of a cryptographic key, the more difficult the task of discovering the key sequence. Thus, cryptographic keys with longer bit lengths are more desirable since they generally provide a more secure system, with all other factors being equal.

However, cryptographic security systems are subject to strict controls by governmental authorities. Laws vary from country to country, but almost all industrial nations control the strength of security-related products that cross their borders. Some nations such as the United States control export only, while others, such as France, control both export and import. Companies that manufacture products that use cryptography must design their products to conform to various governmental regulations to import or export their products to foreign markets. Moreover, oftentimes, manufacturers must produce different versions of their products for different countries. This introduces additional development expenses and complexity.

Typically, cryptographic strength is controlled by limiting the number of bits in the keys, and consequently, the number of possible unique keys. For example, the DES algorithm could be exported for satellite television conditional access applications if the 56-bit key is reduced to 40 bits by fixing 16 bits to a constant (e.g., zero). Similarly, in the DVB Common Scrambling Algorithm, a 64 bit key could be reduced to a 48 bit key by fixing 16 bits. However, while reducing the cryptographic key bit length satisfies governmental authorities, it also weakens the cryptographic strength of conventional systems. Accordingly, it would be desirable to provide a cryptographic system that can be easily weakened to satisfy government requirements, but which is not weakened for the purpose of defending against hostile attackers. The system should thus provide a level of security to attackers that is greater than the level presented to a governmental agency. Furthermore, the system should include a common encryption engine which can be adapted to different key bit-length requirements by a simple re-programming at the time of manufacture. The present invention provides the above and other advantages.

SUMMARY OF THE INVENTION

In the present invention, the number of possible cryptographic key combinations can be reduced in a manner that is not known to an attacker. The key has a large bit-length that provides a high security level and maintains a burdensome analysis task for a prospective attacker. But, with knowledge of a secret distribution key, the number of possible key combinations (e.g., the key space size) can be reduced to provide a lower security level that satisfies governmental requirements. In particular, a larger key length of, for example, B=56 bits is used. With knowledge of the secret distribution key, the $S=2^{56}$ available key combinations can be reduced to a subset (e.g., $W=2^{40}$) of key combinations. To conceal the fact that a subset of the larger set of keys is used, the selected subset is distributed throughout the larger set of keys using a random process or some other process that is unknown to an attacker. Up to $2^{40}$ 56-bit keys can be produced in this manner for cryptographically processing a clear text message.

The governmental agency can be informed of the $2^{40}$ keys out of the total possible $2^{56}$ keys which are used. On the other hand, the attacker has no knowledge that only a subset of keys is used. Even if the attacker knew that only a subset of $2^{56}$ keys was used, he still cannot identify the subset. However, the governmental agency can determine which key is in use at a given time through, for example, a comprehensive list of the $2^{40}$ 56-bit keys, or through a secret key or other algorithm which allows production of such a list. Note that the governmental agency is faced with the same amount of work, or "work factor", (e.g., performing $W=2^{40}$ trials) regardless of the bit length of the keys on their list since the work factor is determined by the number of possible different keys. An attacker, however, cannot create this list, and must therefore check all possible 56-bit key combinations. In the above example, the attacker would need to check all $2^{56}$ 56-bit keys, which is much more effort than that facing the governmental agency. The work factor can therefore be viewed as the average number of trials that must be performed to determine the keys of the cryptographic system. The work factor will be lower, for instance, for a person who knows that the keys are generated in a particular (e.g., non-random) order, with a particular starting point, and in a particular sequence.

The attacker is thus faced with a level of difficulty (work factor) identical to that provided by a 56-bit key, while the government agency is faced with a level of difficulty provided by a 40-bit key. Accordingly, the conflicting goals of designing a system that meets governmental regulations while maintaining cryptographic strength are achieved.

In another aspect of the present invention, a key sequence generator for generating a subset of cryptographic keys out of a larger set is disclosed. In particular, a key generator for generating $2^{B-F}$ cryptographic keys out of a possible $2^B$ cryptographic keys uses a secret double or triple DES key in a hashing algorithm to randomly distribute a key space corresponding to $2^{B-F}$-bit keys over a larger key space which corresponds to $2^B$-bit keys. In this manner, the $2^{B-F}$ different keys can be generated as required by the governmental agency, thereby avoiding the need to store the keys in a large memory.

DETAILED DESCRIPTION OF THE INVENTION

The present invention provides a method and apparatus for generating cryptographic keys which provide a high work factor for a potential hostile attacker, yet can also present a lower work factor to conform to governmental regulations.

A cryptosystem with keys of size B bits allows $S=2^B$ possible unique keys. The number of keys available (e.g., the key space) is typically much larger than needed over a system's useful lifetime. This is desirable since keys should not be repeated, and a large number of unused keys should always remain. A cryptosystem changes to a new key at a rate of R keys per second (kps). When the useful lifetime of a system is Z seconds, which may correspond to a period of several years in some cases, the total number of keys used over the system lifetime is RZ. RZ should be much smaller than the total number S of available keys in order to maintain a large number of unused keys (e.g., RZ<<S). After the system lifetime RZ has elapsed, the system is considered to be obsolete and no additional keys are produced.

An attacker or attacker of the system keys can thus obtain new keys at the rate R kps. After a time period t has elapsed (where t<Z), the observer will have seen at most Rt keys, where Rt<RZ<<S. The strength of the system is directly related to the advantage gained by an attacker who observes these Rt keys. If Rt keys can be used to somehow extrapolate or guess the method of generating all the keys, then the attacker may be able to determine all subsequent keys for the remaining life of the system, and the system will be compromised.

Generally, for a cryptographic system with cryptographic keys having a length of B bits and $2^B$ possible cryptographic key combinations, the present invention provides a system wherein, with knowledge of a secret distribution key, a reduced number of cryptographic key combinations comprising $2^N=2^{B-F}$ key combinations can be derived. The reduced number of key combinations can be derived by fixing a number F of the B bits in each key. Generally, it is hard to hide the fact that a system has some number F of key bits fixed to a known value. That is, discovery of the F fixed bits is very probable. For example, a DES key with B=56 bits reduced to N=40 bits (F=16) will be obvious after only 2 or 3 such keys are observed if each key has the same F bits in the same places. It is extraordinarily unlikely that a succession of B=56 bit words will be observed by chance where the last F=16 bits of each word are fixed to zero. Specifically, with a number of observations M, the probability P of the same F bits agreeing is $2^{-MF}$, which for 40 bit DES key with M=3 observations, is $P=3.55\times10^{-15}$. Conversely, the probability of the same F bits not agreeing is P=99.9999999999996%. The attacker therefore knows the number and position of fixed bits after very few observations, and can adjust the attack strategy to reduce his work factor.

In the above case, Rt keys are sufficient for an attacker to know that all keys are only 40 bits long for a value of t that is very small. Once this is known, the attacker knows that the number of required guesses to determine a key with certainty is reduced to $2^{B-F}$ from $2^B$. For the 40 bit DES example, this is a gain to the attacker in the form of a 99.9984741% reduction in effort.

As discussed, many governmental agencies require a work factor corresponding, at most, to a 40 bit key system. But, the attacker should not be able to take advantage of the fact that a 40-bit key work factor exists, even if it is public knowledge. That is, even if an attacker knows that the key space of the cryptographic key can be reduced, the attacker does not possess the knowledge to obtain this reduction. However, the governmental agency can be provided with the additional information that allows it to face a system with only a work factor corresponding to 40-bit keys, while the attacker faces a system with a work factor corresponding to a much larger key, such as 56 or 64 bits.

Since the total keys that can be observed at a time t is Rt, it is desirable to make the work factor W>Rt by some comfortable protection factor P. To assure this is true for the useful lifetime of the cryptosystem, we should have W>RZ, where Z is the lifetime. Assuming Z=10 years or $3.15\times10^8$ seconds ($8.75\times10^4$ days), the limitation on W becomes $W \geq P \times R \times 3.15\times10^8$, which gives the inverse relationship $P=W/(R\times3.15\times10^8)$, shown in Table I, below.

Table I, which assumes a lifetime Z of 10 years, indicates the protection factor P for a rate of key change R, and for a work factor W dictated by governmental regulations. As shown, the rate of change R of a key is inversely proportional to a protection factor P for a given number of available keys. The number of available unique keys, such as W or S, corresponds to the work factor since it indicates the amount of work required to determine a key. For example, with a work factor W, each key may assume one of W possible variations. With a work factor S, there may be S possible key variations. P is the ratio of the number of available keys to the number of keys visible over the lifetime of the cryptosystem (e.g., P=W/RZ). For example, for a 40-bit DES system with $W=2^{40}$ available keys, a key rate of change R=0.01 kps, and a lifetime Z=10 years, the protection factor $P=3.5\times10^4$.

TABLE I

Protection Factor P for Rates R and Work W

| R (key per sec) | R⁻¹ (days) | W = $2^{16}$ | W = $2^{24}$ | W = $2^{32}$ | W = $2^{40}$ | W = $2^{48}$ | W = $2^{56}$ |
|---|---|---|---|---|---|---|---|
| $10^1$ kps | 1.2 × $10^{-6}$ | 2.1E-06 | 5.3E-04 | 1.4E-01 | 3.5E+01 | 8.9E+03 | 2.3E+06 |
| $10^0$ kps | 1.2 × $10^{-5}$ | 2.1E-05 | 5.3E-03 | 1.4E+00 | 3.5E+02 | 8.9E+04 | 2.3E+07 |
| $10^{-1}$ kps | 1.2 × $10^{-4}$ | 2.1E-04 | 5.3E-02 | 1.4E+01 | 3.5E+03 | 8.9E+05 | 2.3E+08 |
| $10^{-2}$ kps | 1.2 × $10^{-3}$ | 2.1E-03 | 5.3E-01 | 1.4E+02 | 3.5E+04 | 8.9E+06 | 2.3E+09 |
| $10^{-3}$ kps | 1.2 × $10^{-2}$ | 2.1E-02 | 5.3E+00 | 1.4E+03 | 3.5E+05 | 8.9E+07 | 2.3E+10 |
| $10^{-4}$ kps | .12 | 2.1E-01 | 5.3E+01 | 1.4E+04 | 3.5E+06 | 8.9E+08 | 2.3E+11 |
| $10^{-5}$ kps | 1.2 | 2.1E+00 | 5.3E+02 | 1.4E+05 | 3.5E+07 | 8.9E+09 | 2.3E+12 |
| $10^{-6}$ kps | 12 | 2.1E+01 | 5.3E+03 | 1.4E+06 | 3.5E+08 | 8.9E+10 | 2.3E+13 |
| $10^{-7}$ kps | 120 | 2.1E+02 | 5.3E+04 | 1.4E+07 | 3.5E+09 | 8.9E+11 | 2.3E+14 |
| $10^{-8}$ kps | 1200 | 2.1E+03 | 5.3E+05 | 1.4E+08 | 3.5E+10 | 8.9E+12 | 2.3E+15 |

Shading indicates Protection factors P less than or about 1

It is desirable to have a large protection factor (e.g., P>>1) to maintain a large number of unused keys throughout the lifetime of the system and to avoid the need to repeat a key. Thus, for a given W, more protection is afforded with a lower rate of change R or lifetime Z, since a lower R provides fewer keys for an attacker to use, and a shorter lifetime Z reduces the available time for an attacker to compromise the system. Alternatively, a larger W will also yield a larger protection factor P.

Note that it is possible for a governmental agency to require a relatively small value of W (e.g., W=32). In this case, up to $2^{32}$ distinct cryptographic keys from S possible keys are available. With a small W, the system can be compromised relatively easily, and the system is said to be degenerate. Thus, even with a large protection factor, it should be noted that the system may still be compromised if W is small enough.

The present invention maintains a sufficiently large protection factor P while conforming to governmental regulations by limiting the number of available keys. Keys are provided having an actual length B, but an effective length N, since only $2^N$ different keys are available. The governmental agency is given information, such as a secret distribution or hash key, that allows it to determine this list of $2^N$ keys. The present invention thus provides a method and apparatus for concealing the fact that a B-bit key has a work factor associated with a N-bit key rather than a B-bit key. With F bits fixed, only $W=2^{B-F}=2^N$ different keys are possible instead of $S=2^B$. To preclude detection of the scheme, the same F bits cannot be fixed in each key. A governmental agency can still decode the system as if it had W possible keys by providing a list of the W keys which were selected from the S possible keys. As long as it is known that all keys in use in the cryptosystem are on the list, no more than W attempts will be required to decode a key.

However, it is problematic to simply store W keys since, for DES keys with 40 bits, $W=2^{40}=1\times10^{12}$ bits, which would require roughly 8 million megabytes of storage. Thus, a scheme is required to provide a way to know the entire list of W keys without actually storing the keys themselves.

Figure 1:
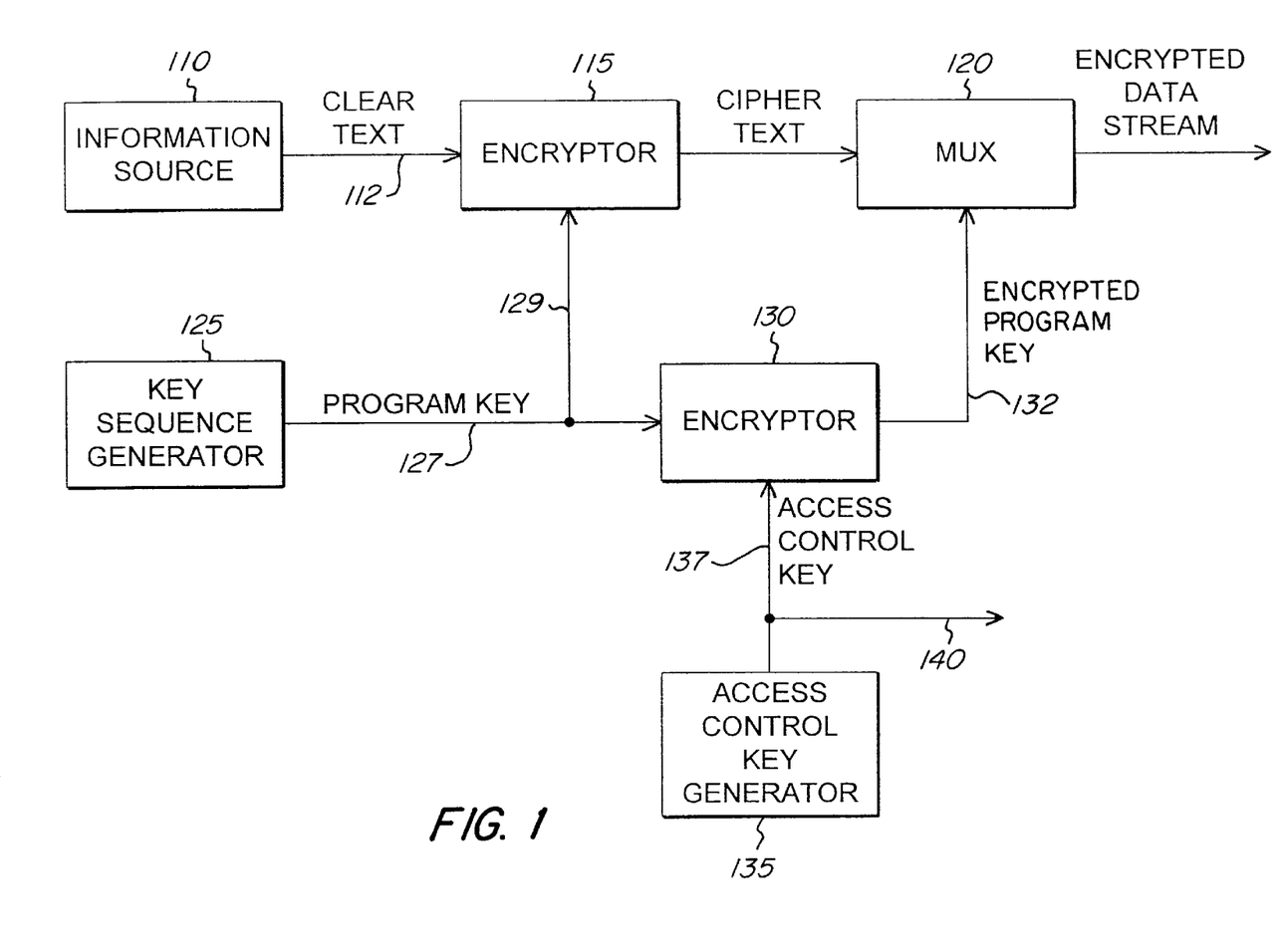
FIG. 1 is a block diagram of an encryption system in accordance with the present invention.

FIG. 1 is a block diagram of an encryption system in accordance with the present invention. An information source 110 provides a clear text information sequence via line 112 for encryption by encryptor 115. The information sequence may comprise, for example, a stream of binary data. A key sequence generator 125 provides a plurality of cryptographic keys (program keys) via lines 127 and 129 for use by the encryptor 115. The program keys themselves are encrypted by an encryptor 130 under the control of an access control key provided by access control key generator 135 via line 137. The encrypted program keys are then sent via line 132 to multiplexer 120 where the cipher text and encrypted program keys are multiplexed to provide an encrypted data stream for transmission to a receiver or storage on a storage medium.

In operation, the key sequence generator 125 generates a sequence of cryptographic keys which is used to encrypt the program material 110. The keys are unique and have B bits, with a work factor of up to $S=2^B$. For instance, with B=56, up to $2^{56}$ different keys may be produced. The access control key from generator 135 is periodically changed and distributed to subscribers. For example, the access control key might be a key which changes monthly and is distributed to paying subscribers, while the program key might change once each second (R=1 kps) and is distributed in encrypted form along with the information source. The present invention is embodied, in part, in a key generation system such as might be used for realizing key sequence generator 125 or access control key generator 135.

Figure 2:
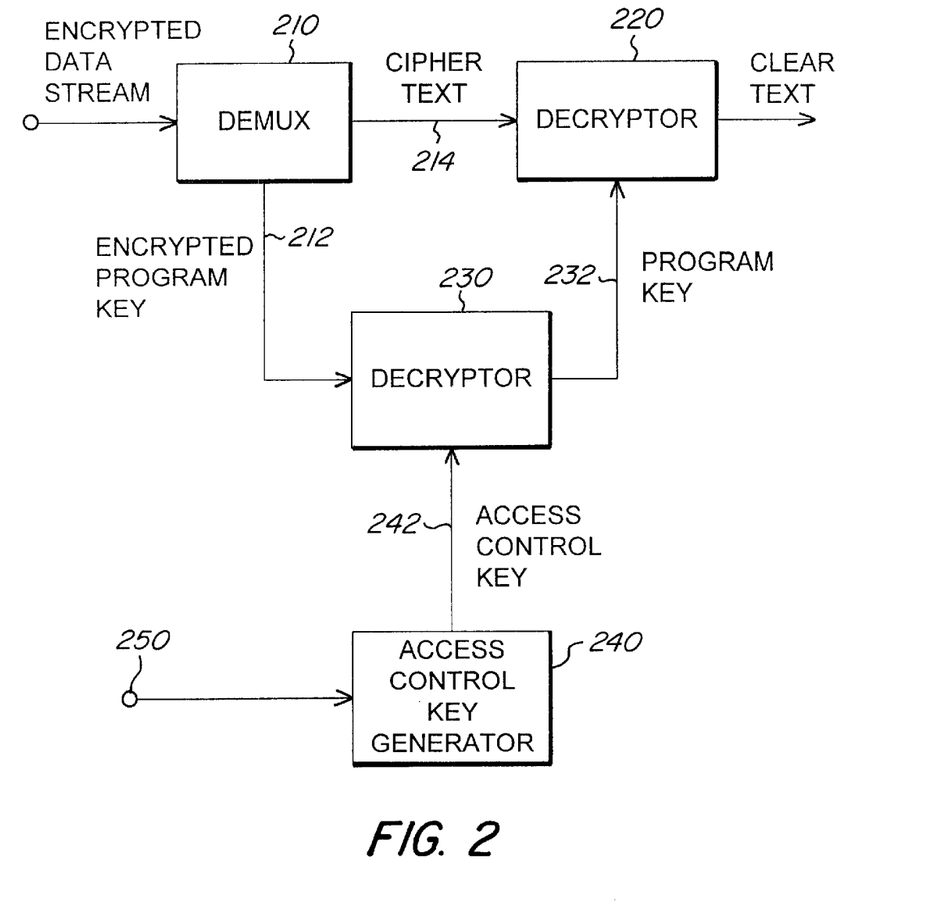
FIG. 2 is a block diagram of a decryption system in accordance with the present invention.

FIG. 2 is a block diagram of a decryption system in accordance with the present invention. An encrypted data stream including cipher text and the encrypted program keys are received by demultiplexer 210. The demultiplexer 210 provides the cipher text to decryptor 220 via line 214, while the encrypted program key is provided to decryptor 230 via line 212. The decryptor 230 decrypts the program key and provides it to the decryptor 220 via line 232. The decryptor 220 then decrypts the cipher text to recover the clear text information sequence. The decryptor 230 operates under the control of an access control key provided via line 242 by access control key generator 240. The access control key generator is responsive to an input signal received via terminal 250. The signal may be delivered from the transmitter to the receiver in the encrypted data stream (either in-band or out-of-band) or via a separate key distribution system (not shown).

Figure 3:
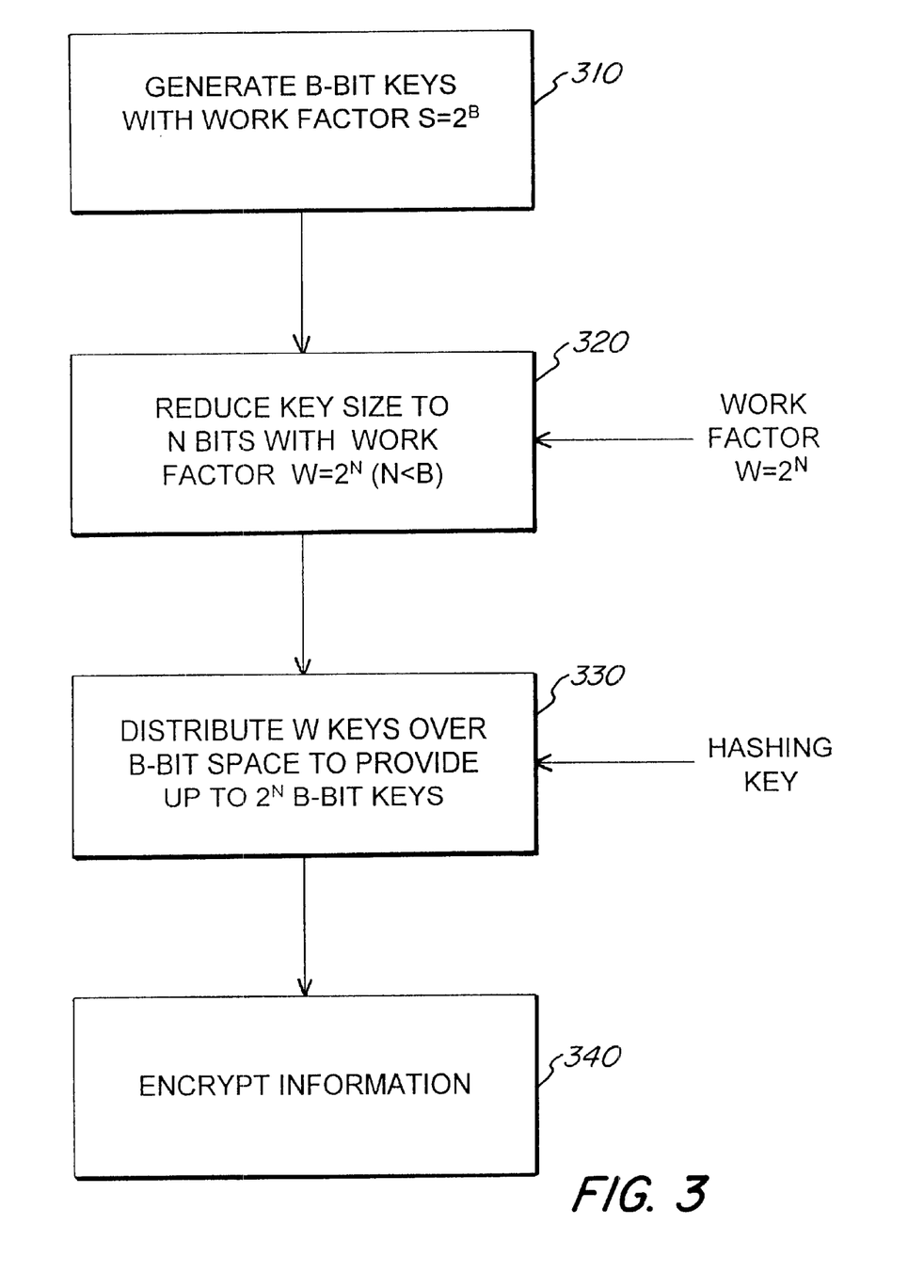
FIG. 3 is a block diagram of a key sequence generation method in accordance with the present invention.

FIG. 3 is a block diagram of a key sequence generation method in accordance with the present invention. At block 310, a first B-bit key with a work factor of up to $S=2^B$ is generated using, for example, a random or non-random key generator. Next, at block 320, the key space is reduced from a key space of an S-bit key to a key space of an N-bit key, with an associated work factor of up to $W=2^N$, where N<B and W<S. For example, B=56, $S=2^{56}$, N=40, and $W=2^{40}$. Block 320 employs, for example, AND functions ("ANDing"), OR functions ("ORing"), hashing, public key encryption, exponentiation, list arrangement, Boolean operations, arithmetic operations, modulo operations, and table look-up operations to provide a reduced key space. The function 320 is responsive to the work factor W, which is indicative of the amount of work that must be done to decode the keys. The required work factor W is determined typically by governmental regulations.

Next, at block 330, the key space of the N-bit key is distributed (e.g., "scattered") over a key space of a B-bit key space to provide up to $2^N$ different B-bit keys. A B-bit key space comprises all $2^B$ possible sequences of B bits which could constitute a key. The distribution may be accomplished using a number of techniques, including ANDing, ORing, hashing, public key encryption, exponentiation, list arrangement, Boolean operations, arithmetic operations, modulo operations, and table look-up operations to provide the B-bit cryptographic key. In the embodiment shown, block 330 uses a hashing key K.

At block 340, the B-bit keys are used to encrypt information. In accordance with the invention, since each key has B-bits, the work factor to decode the system appears to an attacker as $S=2^B$ since he does not know the hashing key. However, with knowledge of the hashing key, a government agency will face a work factor of only $W=2^N$. Accordingly, the seemingly contradictory goals of reducing the work factor without reducing the protection factor can be realized.

An attacker who observes the keys output after hashing with K cannot determine that only W unique keys exist without knowing K. Furthermore, if the distribution hash function is a one way function, then the number of unique keys W cannot be determined at all even when K is known. This forces the attacker to guess the number of keys and hash forward to compare with his observations. The attacker can make no assumption about the number of keys based on the observed keys, so he must expend an amount of work S which is much greater than W. The reduction in strength of the system due to the use of fixed bits in the keys is invisible to the attacker.

Note that while FIG. 3 provides a method for providing W keys as a subset of S keys, in practice it is not necessary to generate all S keys to provide the W keys used for encryption. That is, the procedure can be accomplished on a key-by-key basis. For instance, a single B-bit key can be generated at block 310. The key space can then be reduced to N bits at block 320. Then, at block 330, the N bit key is mapped to a B bit key under the control of the hashing key, thereby providing a B-bit key with an apparent size of B-bits and an effective size of N bits. At block 340, the new B-bit key is used to encrypt the information.

Figure 4:
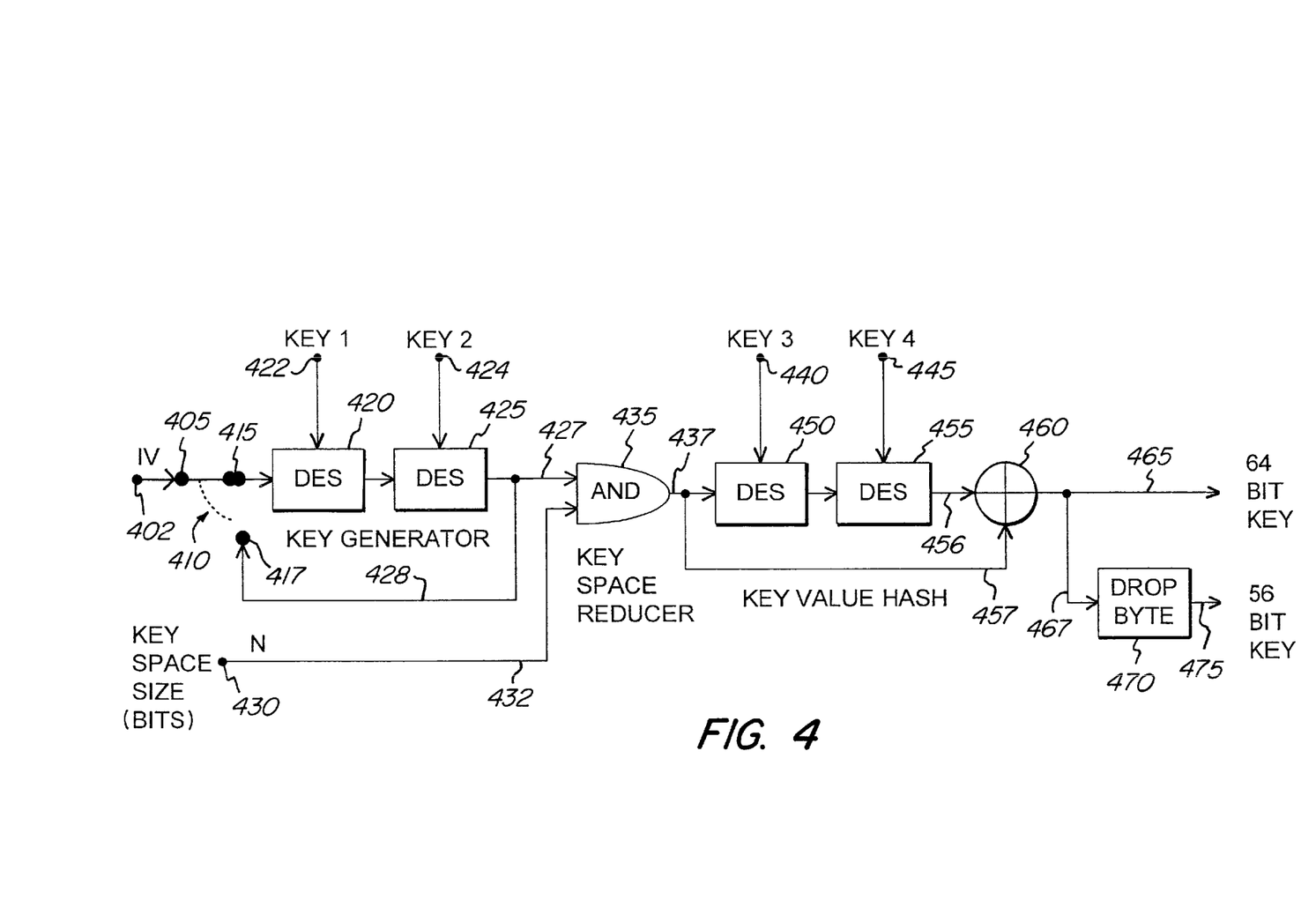
FIG. 4 is a block diagram of a key sequence generator in accordance with the present invention.

FIG. 4 is a block diagram of a key sequence generator in accordance with the present invention. The key sequence generator comprises a Key Generator, a Key Space Reducer, and a Key Value Hash Function. An initialization vector (IV) is input to terminal 402, then provided to DES key generator 420 via terminals 405 and 415 of switch 410. DES key generators 420 and 425 receive Key 1 and Key 2, respectively, via terminals 422 and 424. The IV, Key 1 and Key 2 are known and supplied, for example, by a governmental agency. DES generator 420 uses the IV to generate a key that is used, in turn, by DES generator 425 to generate another key which is provided to AND function 435 via line 427. After the IV has been used by DES generator 420, the switch 410 is activated to couple terminals 415 and 417 and decouple terminals 405 and 415. DES generator 420 then receives the output of DES generator 425 as a feedback signal via line 428 and terminal 415, and continues to generate additional keys.

A Key Space Size input variable (e.g., sequence of bits) is provided via terminal 430 and line 432 to the AND gate 435. N denotes the number of ones in a given sequence of the input variable. When the input variable bit on line 432 is a one, the bit on line 427 will pass through the AND gate 435 unchanged. However, when the input variable is a zero, the bit on line 427 will be set to zero by the AND gate 435. The Key Generator section of the key sequence generator of FIG. 4, including DES generators 420 and 425, can generate up to $2^B$ distinct programmable keys. B is an integer less than or equal to 64, for example. In particular, with B=64, the key generator can supply up to about $2^{63}$ random 64-bit values under the control of the fixed and known IV and Keys 1 and 2. The Key Space Reducer AND gate 435 reduces the possible values output from the generator from $\{0:2^{64}-1\}$ to $\{0:2^N-1\}$, where N=B-F is the number of ones in the key space size input variable. For instance, with F=16 fixed bits, N=64−16=48 bits.

Note that the Key Generator section shown performs double DES operations since there are two DES generators, 420 and 425. This system is theoretically vulnerable to so-called meet-in-the-middle attacks. However, this type of attack requires $2^{68}$ or $2.95\times10^{20}$ bytes of memory storage, and is therefore considered highly remote. An additional DES generator can be provided to provide triple operations to avoid this abstract concern.

The reduced output key from the AND gate 435 is provided via line 437 to the Key Value Hash section. In particular, the key is received by DES generator 450, which is responsive to Key 3 provided via terminal 440. DES generator 450 provides a key to DES generator 455, which is responsive to Key 4 provided via terminal 445. Keys 3 and 4 are known to the relevant government agency. A key is then provided via line 456 to an adder 460. Adder 460 also receives a feed-forward signal via line 457, and outputs the final B-bit cryptographic key via line 465. With B=64, a 64-bit key is provided via line 465. Optionally, a Drop Byte function 470 receives the 64-bit key via line 467, and drops eight of the bits to provide a 56-bit key via line 475. In this manner, the same encryption engine may provide different key sizes as required by governmental regulations. The cryptographic keys are then used by an encryptor such as the encryptor 115 of FIG. 1.

The double DES Key Value Hash under fixed and known Keys 3 and 4 distributes the reduced set of $2^N$ keys randomly over $2^B$ values, making prediction extremely difficult for an attacker. Keys of any size can be generated in this way, either by using less than 64 bits of a single output, or by using multiple outputs to assemble keys longer than 64 bits.

As can be seen, the present invention provides a method and apparatus for maintaining the protection factor of a cryptographic system while reducing the work factor to a level required by governmental regulations. The invention thus allows a cryptographic system with an encryption engine that can be used for both domestic and foreign applications, with the only difference being a programming modification at the time of creation of the system. This is accomplished using a cryptographic distribution function that selects N-bit keys randomly from up to S possible B-bit keys, where N<B. The key space of the N-bit keys is then randomly distributed over a key space corresponding to B-bit keys such that the presence of the fixed bits cannot be ascertained without knowing the cryptographic keys used in the distribution function. Selection and distribution may also be non-random. Furthermore, knowledge of the distribution function itself is useless without knowledge of the keys used with it.

Although the invention has been described in connection with various specific embodiments, those skilled in the art will appreciate that numerous adaptations and modifications may be made thereto without departing from the spirit and scope of the invention as set forth in the claims. For instance, the number of bits in each key may vary. Moreover, it is possible to extend the inventive concept to provide keys with more than two different work factors by providing a corresponding number of secret distribution keys. Furthermore, although the invention has been discussed primarily in conjunction with a DES-type private key cryptographic system, the invention is also applicable to other cryptographic systems, including public key systems. With a public key system, the relationship between the bit size and the key space is somewhat more complex. Generally, compared to a symmetric block cypher such as a DES system, the bit length of the public key must be several times larger to provide the same key space size.

What is claimed is:

1. A method for providing a cryptographic key for cryptographically processing information, said method comprising the steps of:
   (a) generating a first key according to a key generator scheme;
   (b) reducing a key space of said first key in accordance with a key space reduction function; and
   (c) distributing said reduced key space over a larger key space in accordance with a one-way key space distribution function to provide said cryptographic key; wherein:
   said cryptographic key has an associated first work factor S for a person without knowledge of said key space distribution function; and
   said cryptographic key has an associated second work factor W<S for a person with knowledge of said key space distribution function.

2. The method of claim 1, wherein said larger key space is indicative of said first work factor; and
   said reduced key space is indicative of said second work factor.

3. The method of claim 1, wherein said second work factor is the same as a work factor of said reduced key space.

4. The method of claim 1, wherein said key generator scheme generates said first key randomly.

5. The method of claim 1, wherein said key space reducing scheme comprises the step of performing a digital logic function on said first key to provide said reduced key space.

6. The method of claim 1, wherein said key space distribution function is implemented by the steps of:
   providing a second key; and
   distributing said reduced key space over said larger key space in accordance with said second key to provide said cryptographic key.

7. The method of claim 1, wherein said key space distribution function comprises the step of performing a digital logic function on said reduced key to provide said cryptographic key.

8. The method of claim 1, comprising the further step of:
   dropping bits from said cryptographic key to provide a reduced bit length cryptographic key.

9. The method of claim 1, comprising the further steps of:
   providing a key space size input variable; and
   controlling a size of said reduced key space in accordance with said input variable.

10. The method of claim 9, wherein said key space reducing scheme comprises at least one of:
   (a) ANDing of said input variable with said first key to provide said reduced key space; and
   (b) ORing of said input variable with said first key to provide said reduced key space.

11. The method of claim 1, wherein said cryptographic key is a B-bit key, and said first work factor is no greater than $S=2^B$.

12. The method of claim 11, wherein said reduced key space corresponds to a key space of a (B-F)-bit key; and
   said second work factor is no greater than $W=2^{B-F}$.

13. The method of claim 1, wherein said distributing step comprises the steps of:
   encrypting a key with said reduced key space to provide an encrypted reduced key; and
   combining (i) said key with said reduced key space with (ii) said encrypted reduced key to provide said cryptographic key.

14. The method of claim 1, comprising the further steps of:
   encrypting data using said cryptographic key; and
   communicating said cryptographic key over a communication channel for use in decrypting said encrypted data.

15. The method of claim 1, wherein said information is cryptographically processed in a cryptographic system having a lifetime Z, comprising the further steps of:
   (d) cryptographically processing said information using said cryptographic key; and
   (e) repeating said steps (a)–(d) at a key rate of R keys per second to provide a desired protection factor P=W/RZ for said cryptographic system.

16. The method of claim 15, wherein P>1.

17. The method of claim 15, wherein P>>1.

18. Apparatus for providing a cryptographic key for cryptographically processing information, comprising:
   a key generator for generating a first key according to a key generator scheme;
   a key space reducer operatively associated with said key generator for reducing a key space of said first key in accordance with a key space reducing scheme;
   a key distributor operatively associated with said key space reducer for distributing said reduced key space over a larger key space in accordance with a one-way key space distribution function to provide said cryptographic key; wherein:
   said cryptographic key has an associated first work factor S for a person without knowledge of said key space distribution function;
   said cryptographic key has an associated second work factor W<S for a person with knowledge of said key space distribution function.

19. The apparatus of claim 18, wherein said larger key space is indicative of said first work factor; and
   said reduced key space is indicative of said second work factor.

20. The apparatus of claim 18, wherein said second work factor is the same as a work factor of said reduced key space.

21. The apparatus of claim 18, wherein said key space reducer comprises:
   means for performing a digital logic function on said first key to provide said reduced key space.

22. The apparatus of claim 18, wherein said key space distributor comprises:
   means for performing a digital logic function on said reduced key to provide said cryptographic key.

23. The apparatus of claim 18, further comprising:

means for providing a key space size input variable to said key space reducer; wherein said key space reducer controls the size of said reduced key space in accordance with said input variable.

24. The apparatus of claim 23, wherein said key space reducer comprises at least one of:

(a) an AND gate for ANDing of said input variable with said first key to provide said reduced key space; and (b) an OR gate for ORing of said input variable with said first key to provide said reduced key space.

25. The apparatus of claim 18, wherein said key distributor comprises:

means for encrypting a key with said reduced key space to provide an encrypted reduced key; and means for combining (i) said key with said reduced key space with (ii) said encrypted reduced key to provide said cryptographic key.

26. The apparatus of claim 18, wherein said information is cryptographically processed in a cryptographic system having a lifetime Z, further comprising:

means for cryptographically processing said information using said cryptographic key;

wherein, at a key rate of R keys per second:

(a) said key generator generates another one of said first keys, then (b) said key space reducer reduces a key space of said another one of said first keys, then (c) said key distributor distributes said reduced key space of said another one of said first keys over said larger key space to provide another one of said cryptographic keys, and then (d) said processing means cryptographically processes said information using said another one of said cryptographic keys, to provide a desired protection factor $P=W/RZ$ for said cryptographic system.

27. The apparatus of claim 26, wherein $P>1$.

28. The apparatus of claim 26, wherein $P\gg 1$.

* * * * *

UNITED STATES PATENT AND TRADEMARK OFFICE
CERTIFICATE OF CORRECTION

PATENT NO.      : 6,424,713 B1
DATED           : July 23, 2002
INVENTOR(S)     : Sprunk It is certified that error appears in the above-identified patent and that said Letters Patent is hereby corrected as shown below:

<u>Title page,</u>
Insert -- [*] Notice: Under 35 U.S.C. 154(b), the term of this patent shall be extended for 977 days. --.

Signed and Sealed this

Third Day of December, 2002

JAMES E. ROGAN
*Director of the United States Patent and Trademark Office*